(12) United States Patent
Cheng et al.

(10) Patent No.: US 9,004,418 B2
(45) Date of Patent: Apr. 14, 2015

(54) ADJUSTABLE ELEVATING SUPPORTER FOR TELEVISION

(71) Applicants: Jiahe Cheng, Guangdong (CN); Dehua Li, Guangdong (CN)

(72) Inventors: Jiahe Cheng, Guangdong (CN); Dehua Li, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 151 days.

(21) Appl. No.: 13/703,063

(22) PCT Filed: Oct. 11, 2012

(86) PCT No.: PCT/CN2012/082801
§ 371 (c)(1),
(2) Date: Dec. 10, 2012

(87) PCT Pub. No.: WO2014/047975
PCT Pub. Date: Apr. 3, 2014

(65) Prior Publication Data
US 2014/0092317 A1    Apr. 3, 2014

(30) Foreign Application Priority Data
Sep. 28, 2012   (CN) .......................... 2012 1 0370250

(51) Int. Cl.
*H04N 5/655* (2006.01)
*F16M 11/28* (2006.01)
*F16M 11/04* (2006.01)

(52) U.S. Cl.
CPC ............... *H04N 5/655* (2013.01); *F16M 11/04* (2013.01); *F16M 11/28* (2013.01); *F16M 2200/028* (2013.01); *F16M 2200/048* (2013.01)

(58) Field of Classification Search
CPC . F16M 11/28; F16M 11/08; F16M 2200/028; F16M 2200/048
USPC ............ 248/157, 917, 346.06, 161, 404, 150, 248/149; 361/679.01
See application file for complete search history.

(56) References Cited

U.S. PATENT DOCUMENTS

| 859,233 | A | * | 7/1907 | Lane | 52/111 |
| 2,291,593 | A | * | 7/1942 | Hubbard | 294/174 |
| 2,649,104 | A | * | 8/1953 | Militano | 135/74 |
| 5,690,310 | A | * | 11/1997 | Brown | 248/448 |
| 6,381,125 | B1 | * | 4/2002 | Mizoguchi et al. | 361/679.08 |

* cited by examiner

*Primary Examiner* — Amy Sterling
(74) *Attorney, Agent, or Firm* — Kirton McConkie; Evan R. Witt

(57) ABSTRACT

The present invention discloses an adjustable elevating supporter for TV which comprises: a combination seat combined to and supporting a liquid crystal television; a supporter comprising: an upper support shaft having an upper end combined to the combination seat and a lower end provided with at least one pair of fixing insertion holes; and a lower support shaft having an axial hole in which the lower end of the upper support shaft is inserted and at least two pairs of insertion holes; an elastic limit piece received in the upper support shaft, and having two ends elastically abutting against the fixing insertion hole and one pair of the insertion holes; an adjusting spring received in the axial hole of the lower support shaft to elastically support the lower end of the upper support shaft upward; and a base connected to a bottom of the lower support shaft.

14 Claims, 5 Drawing Sheets

ADJUSTABLE ELEVATING SUPPORTER FOR TELEVISION

FIELD OF THE INVENTION

The present invention relates to a supporter for television, and more particularly to an adjustable elevating supporter for television.

BACKGROUND OF THE INVENTION

Today, due to the continuous improvement of living standards and the rapid development of electronic industry, television (TV) is not only very popular but also continually upgraded. The flat-panel TVs of liquid crystal display (i.e. LCD TV) are marketed now, and thus it brings people various selections. However, how to adjust the placement of the flat-panel TV of LCD to improve the watch quality and watch comfort is a problem needed to be solved.

Because the position of watching TV frequently changes, the best angle between the plane of the TV monitor and the line of sight is about 90 degrees, otherwise, the images are easily distorted. However, the traditional TV monitor mostly cannot be elevated or descended. If the height of TV monitor cannot be adjusted, it generally cannot give people most healthy visual experience, resulting in easily causing eye fatigue.

Therefore, it is necessary to provide a supporter for TV to solve the problems of the prior art.

SUMMARY OF THE INVENTION

In view of this, the present invention provides a supporter for TV, in order to solve the problems of difficult lift of the supporter for TV existing in the conventional technologies.

A primary object of the present invention is to provide a supporter for TV, which can easily elevate a TV monitor to a desired position, so as to provide TV watchers with a comfortable and healthy view quality.

To achieve the above object, one embodiment of the present invention provides an adjustable elevating supporter for TV which comprises a combination seat, a supporter, an elastic limit piece, an adjusting spring and a base. The combination seat is combined to and supports a liquid crystal television. The supporter comprises an upper support shaft and a lower support shaft. The upper support shaft has an upper end combined to the combination seat and a lower end provided with at least one pair of fixing insertion holes; and the lower support shaft has an axial hole and at least two pairs of insertion holes, wherein the lower end of the upper support shaft is inserted into the axial hole. The elastic limit piece is received in the upper support shaft, wherein the elastic limit piece comprises two pressing portions and a biasing portion. The two pressing portions elastically abut against and insert in the fixing insertion hole and one pair of the insertion holes. The biasing portion has two ends which bias the two pressing portions. The adjusting spring is received in the axial hole of the lower support shaft to elastically support the lower end of the upper support shaft upward, wherein the adjusting spring includes: an upper support sheet, a lower support sheet and a spring body. The upper support sheet supports the lower end of the upper support shaft. The lower support sheet abuts against the bottom of the axial hole. The spring body has two ends which bias the upper support sheet and the lower support sheet, respectively. The base is connected to the bottom of the lower support shaft.

In one embodiment of the present invention, the spring body is a coil spring.

In one embodiment of the present invention, each of the two pressing portions has a small-diameter portion, a large-diameter portion and an assembling hole. The small-diameter portion has the diameter smaller than or equal to that of the fixing insertion hole and the insertion holes. The large-diameter portion has the diameter greater than that of the fixing insertion hole and the insertion holes, wherein one of the two ends of the bias portion is inserted into the assembling hole.

In one embodiment of the present invention, the biasing portion is a coil spring.

Another embodiment of the present invention is to provide an adjustable elevating supporter for TV which comprises a combination seat, a supporter, an elastic limit piece, an adjusting spring and a base. The combination seat is combined to and supports a liquid crystal television. The supporter comprises an upper support shaft and a lower support shaft. The upper support shaft has an upper end combined to the combination seat and a lower end provided with at least one pair of fixing insertion holes; wherein the lower support shaft has an axial hole and at least two pairs of insertion holes, wherein the lower end of the upper support shaft is inserted into the axial hole. The elastic limit piece is received in the upper support shaft, wherein the two ends of the elastic limit piece elastically abut against the fixing insertion hole and one pair of the insertion holes. The adjusting spring is received in the axial hole of the lower support shaft to elastically support the lower end of the upper support shaft upward. The base is connected to the bottom of the lower support shaft.

In one embodiment of the present invention, the adjusting spring comprises an upper support sheet, a lower support and a spring body. The upper support sheet supports the lower end of the upper support shaft. The lower support sheet abuts against the bottom of the axial hole. The spring body has two ends which bias the upper support sheet and the lower support sheet, respectively.

In one embodiment of the present invention, the spring body is a coil spring.

In one embodiment of the present invention, the elastic limit piece comprises two pressing portions and a biasing portion. The two pressing portions elastically abut against and insert in the fixing insertion hole and one pair of the insertion holes. The biasing portion has two ends which bias the two pressing portions.

In one embodiment of the present invention, each of the two pressing portions has a small-diameter portion, a large-diameter portion and an assembling hole. The small-diameter portion has the diameter smaller than or equal to that of the fixing insertion hole and the insertion holes. The large-diameter portion has the diameter greater than that of the fixing insertion hole and the insertion holes, wherein one of the two ends of the bias portion is inserted into the assembling hole.

In one embodiment of the present invention, the biasing portion is a coil spring.

Furthermore, another embodiment of the present invention is to provide an adjustable elevating supporter for TV which comprises a combination seat, a supporter, an elastic limit piece and a base. The combination seat is combined to and supports a liquid crystal television. The supporter comprises an upper support shaft and a lower support shaft. The upper support shaft has an upper end combined to the combination seat and a lower end provided with at least one pair of fixing insertion holes; wherein the lower support shaft has an axial hole and at least two pairs of insertion holes, wherein the lower end of the upper support shaft is inserted into the axial hole. The elastic limit piece is received in the upper support shaft, wherein the two ends of the elastic limit piece elastically abut against the fixing insertion hole and one pair of the insertion holes. The base is connected to the bottom of the lower support shaft.

In one embodiment of the present invention, the elastic limit piece comprises two pressing portions and a biasing portion. The two pressing portions elastically abut against and insert in the fixing insertion hole and one pair of the insertion holes. The biasing portion has two ends which bias the two pressing portions.

In one embodiment of the present invention, each of the two pressing portions has a small-diameter portion, a large-diameter portion and an assembling hole. The small-diameter portion has the diameter smaller than or equal to that of the fixing insertion hole and the insertion holes. The large-diameter portion has the diameter greater than that of the fixing insertion hole and the insertion holes, wherein one of the two ends of the bias portion is inserted into the assembling hole.

In one embodiment of the present invention, the biasing portion is a coil spring.

Compared with the existing technology, the supporter for TV of the present invention not only can solve the problem which the height of TV cannot be adjusted or is adjusted difficulty, but also can provide watchers with a more comfortable view-angle.

In order to clarify and understand the above-mentioned contents of the present invention, the contents are described in detail by referring to the preferred embodiment with the accompanying drawings, as follows:

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
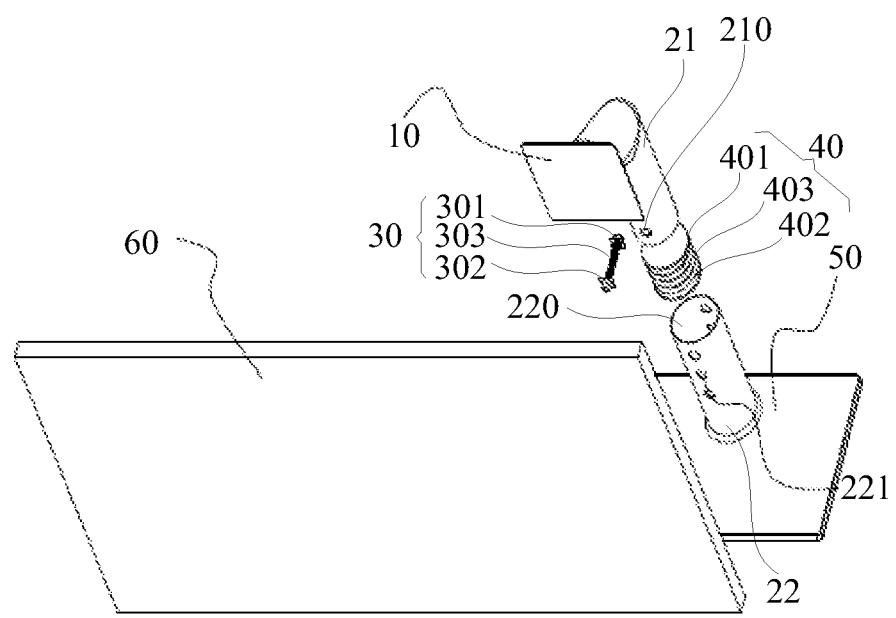
FIG. 1 is an assembled perspective view of a supporter for TV according to one embodiment of the present invention.

Please referring to FIG. 1, a supporter for TV according to one embodiment of the present invention comprises a combination seat 10, a supporter 20, an elastic limit piece 30, an adjusting spring 40 and a base 50. The combination seat 10 is combined to and supports a liquid crystal television 60. The supporter 20 comprises an upper support shaft 21 and a lower support shaft 22. The upper support shaft 21 has an upper end combined to the combination seat 10 and a lower end provided with at least one pair of fixing insertion holes 210. The lower support shaft 22 has an axial hole 220 and at least two pairs of insertion holes 221, wherein the lower end of the upper support shaft 21 is inserted into the axial hole 220. The elastic limit piece 30 is received in the upper support shaft 21, wherein the two ends of the elastic limit piece 30 elastically abut against the fixing insertion hole 210 and one pair of the insertion holes 221. The adjusting spring 40 is received in the axial hole 220 of the lower support shaft to elastically support the lower end of the upper support shaft 21 upward. The base 50 is connected to the bottom of the lower support shaft 22.

In the present embodiment, the combination seat 10 is combined to and supports a liquid crystal television 60 by at least one screw or other equivalent means, such as the combination of hook with slot. The combination seat 10 and the supporter 20 are combined into one piece by the means of welding or using screws. The upper support shaft 21 and the lower support shaft 22 of the supporter 20 can be cylindrical or arbitrary-shaped hollow column structures. In the present embodiment, the lower end of the upper support shaft 21 is preferably inserted into the lower support shaft 22. The material of combination seat 10, the upper support shaft 21, and the lower support shaft 22 can be plastic, metal or the like, and the surfaces thereof can be painted with chromium or lacquer etc. to enhance the texture and anti-oxidation. Or, other surface treatments can be selected according to the need.

Otherwise, in the present embodiment, the elastic limit piece 30 comprises: two pressing portions 301, 302 and a biasing portion 303. The two pressing portions 301, 302 elastically abut against and insert in the fixing insertion hole 210 and one pair of the insertion holes 221. The biasing portion 303 having two ends which bias the two pressing portions 301, 302. The structures of the pressing portions 301, 302 and the biasing portion 303 will be further described in detail hereinafter.

Furthermore, in the present embodiment, the adjusting spring 40 is received in the axial hole 220 of the lower support shaft, and adjusting spring 40 includes: an upper support sheet 401, a lower support sheet 403, and a spring body 402. The upper support sheet 401 supports the lower end of the upper support shaft 21. The lower support sheet 403 abuts against the bottom of the axial hole 220 (the top surface of the base 50). The spring body 402 has two ends which bias the upper support sheet 401 and the lower support sheet 403, respectively. The material of the upper support sheet 401 and the lower support sheet 403 can be selected from plastic or metal which can withstand the pressure of the weight. The spring body 402 can be a coil spring, the sheet-like spring piece or the air spring, etc., and it also can be replaced by elastically stretchable structural components. The base 50 can be a design of a welded or inserted cartridge connected base. According to the use needs, the bottom of the base 50 can be provided with three or more small pulleys or small casters, which also can adjust the horizontal position by sliding the base.

Figure 2:
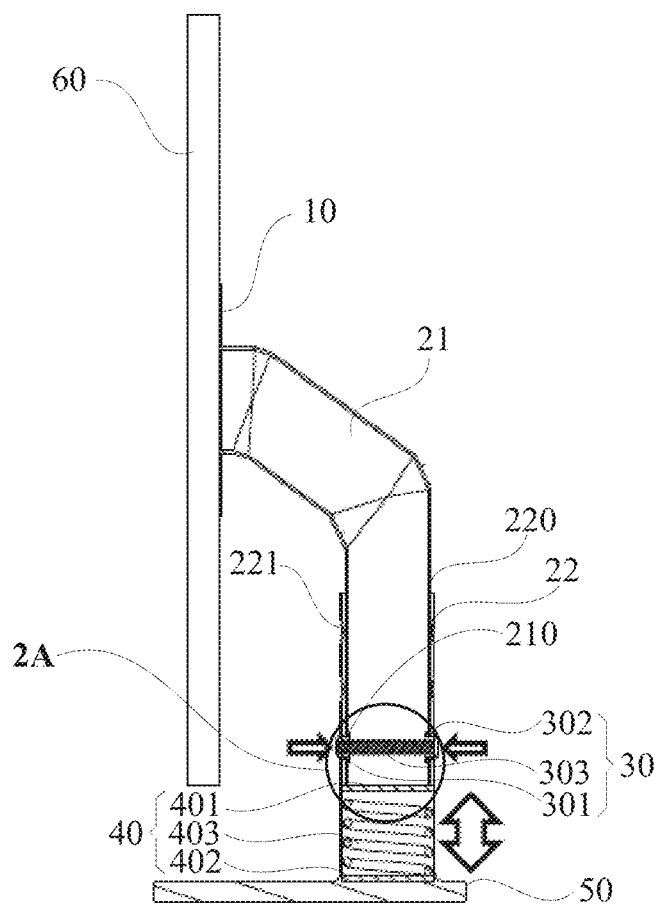
FIG. 2 is a cross-sectional view of the supporter for TV according to one embodiment of the present invention (FIG. 2A is a partial enlarged view of FIG. 2)
Figure 2A:
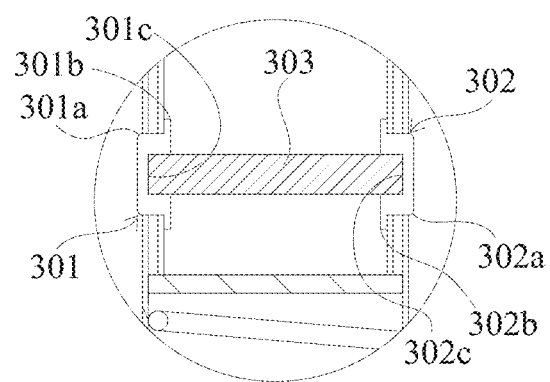
Figure 3A:
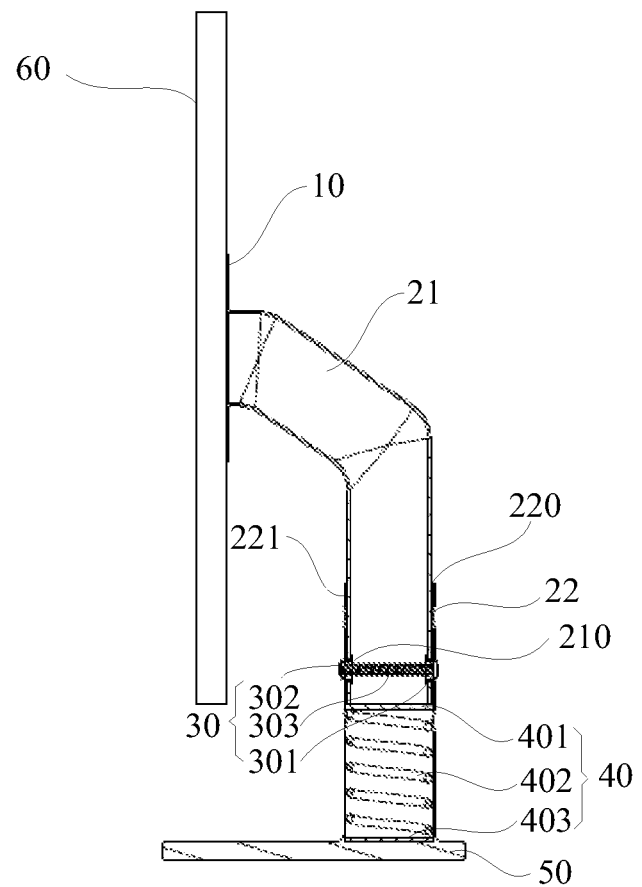
FIG. 3A is a cross-sectional view of the supporter for TV adjusted to a first fixed position according to one embodiment of the present invention.
Figure 3B:
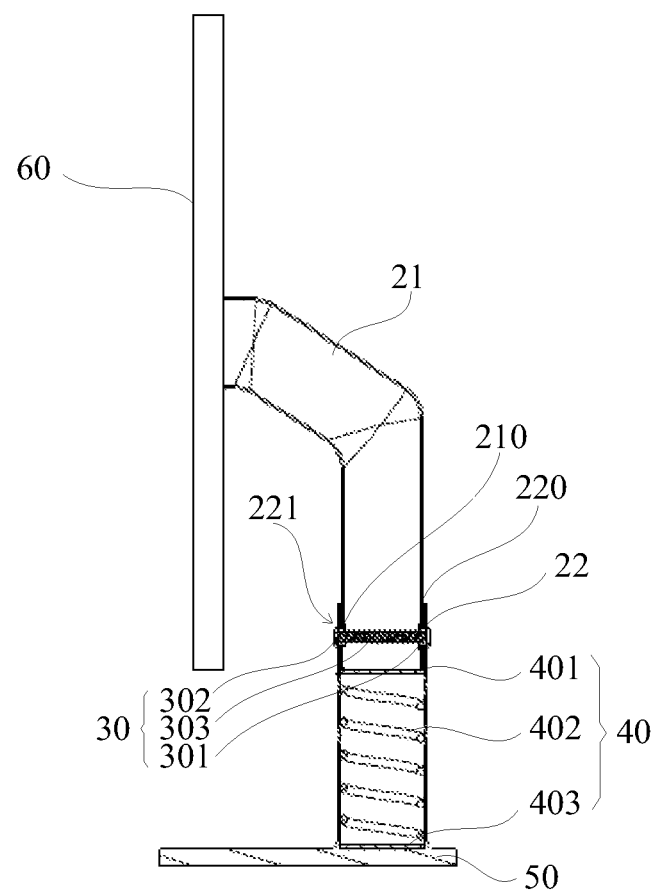
FIG. 3B is a cross-sectional view of the supporter for TV adjusted to a second fixed position according to one embodiment of the present invention.

Please referring to FIG. 2, according to the one embodiment of the present invention, when using the elevating structure to combine with and support a liquid crystal TV 60, a user can select to use one hand to press the upper support shaft 21 before or after the combination seat 10 is combined to the liquid crystal TV 60, while the other hand is used to press the two pressing portions 301, 302 at the two ends of the elastic limit piece 30, so that it will retract into the upper support shaft 21. According to the required height, the upper support shaft 21, the lower support shaft 22, the elastic limit piece 30 and the adjusting spring 40 can be used to elastically adjust the telescopic length, such that the upper support shaft 21 jumps out from the original position and moves in relation to the lower support shaft 22 (i.e. move upward or downward) to achieve a first engaging position, as shown in FIG. 3A; wherein the foregoing operations can be repeated to re-adjust the supporter to achieve a second engaging position, as shown in FIG. 3B. During the operation process of adjusting the height as described above, the upper support sheet of the adjusting spring 40 supports the lower end of the upper support shaft 21 upward, and the lower support sheet 403 abuts against the bottom of the axial hole 220 to maintain the stability of the assembly of the upper support shaft 21, the combination seat 10 and the liquid crystal TV 60.

Figure 4:
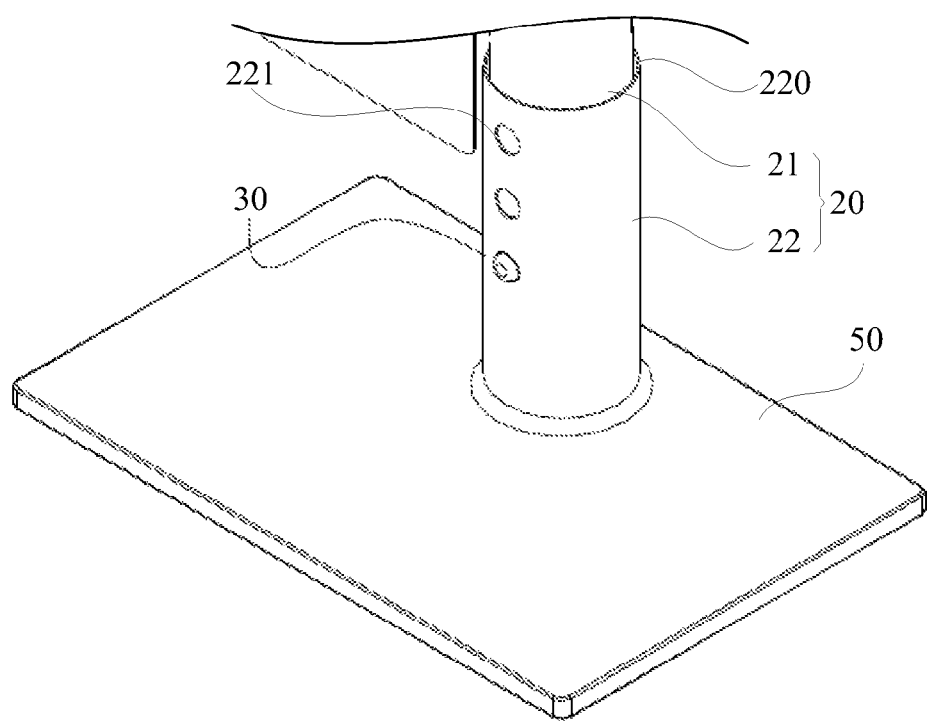
FIG. 4 is an enlarged perspective view of the bottom of the supporter for TV according to one embodiment of the present invention.

Please referring to FIG. 4, it shows an enlarged perspective view of the bottom of the supporter for TV according to one embodiment of the present invention. In this figure with FIGS. 3A and 3B, the combination of the elastic limit piece 30 can be more clearly described. Each of the two pressing portions 301, 302 has a small-diameter portion 301a, 302a, a large-diameter portion 301b, 302b and an assembling hole 301c, 302c. The small-diameter portion 301a, 302a is substantially a hollow convex body. The large-diameter portion 301b, 302b is a flange of the hollow convex body, and the assembling hole 301c, 302c is the interior space of the hollow convex body. The diameter of the small-diameter portion 301a, 302a is smaller than or equal to the diameters of the fixing suck hole 210 and the insertion holes 221, and the diameter of the large-diameter portion 301b, 302b is greater than the diameters of the fixing suck hole 210 and the insertion holes 221, wherein one end of the bias portion 303 is inserted into the assembling hole 301c of the pressing portion 301 and the another end is inserted in the another assembling hole 302c of the pressing portion 302 of the elastic limit piece 30. According to the design of the size described above, the elastic limit piece 30 can insert in the fixing insertion hole 210 and one pair of the insertion holes 221 because of the elastically biasing of the bias portion 303. The appearance of the two pressing portions 301, 302 are round or flat or polygonal, etc., and the surfaces thereof can be patterned to increase the frictional force with the fingers to facilitate the pressing.

It is worthy to noted that the elevating structure of the present invention not only supports the liquid crystal TV 60 and also supports the other type flat plane display (FPD), such as the plasma display panel (PDP) or active matrix organic light emitting diode (AMOLED) plane TV etc.

As described above, compared with the conventional supporter for TV, it cannot be easily elevated to adjust the position of viewing. The present invention provides a supporter for TV, the upper support shaft 21, the lower support shaft 22, the elastic limit piece 30 and the adjusting spring 40 can be adopted to elastically adjust the telescopic length, such that the upper support shaft 21 jumps out from the original position to adjust the supporter for TV to a suitable engaging position, so as to provide the watcher with a comfortable and healthy angle of view.

The present invention has been described with above the related embodiment. However, the above embodiment is merely an example to carry out the present invention. It is noted that that the disclosed embodiment will not limit the scope of the present invention. Conversely, the spirit included in the claims and the modifications of the scope and the equal settings are all included in the scope of the present invention.

What is claimed is:

1. An adjustable elevating supporter for television (TV), comprising:
    a combination seat combined to and supporting a liquid crystal television;
    a supporter, comprising:
        an upper support shaft having an upper end combined to the combination seat and a lower end provided with at least one pair of fixing insertion holes; and
        a lower support shaft having an axial hole and at least two pairs of insertion holes, wherein the lower support shaft is a single segment comprising the at least two pairs of insertion holes, and one pair of the insertion holes is vertically separated from another pair of the insertion holes by a predetermined distance, wherein the lower end of the upper support shaft is inserted into the axial hole;
    an elastic limit piece received in the upper support shaft, wherein the elastic limit piece comprises:
        two pressing portions elastically abutting against and inserting in the fixing insertion hole and one pair of the insertion holes to define at least two different heights of the liquid crystal television; and
        a biasing portion having two ends which bias the two pressing portions;
    an adjusting spring received in the axial hole of the lower support shaft to elastically support the lower end of the upper support shaft upward, wherein the adjusting spring includes:
        an upper support sheet supporting the lower end of the upper support shaft upward;
        a lower support sheet supporting a bottom of the axial hole; and
        a spring body having two ends which bias the upper support sheet and the lower support sheet, respectively; and
    a base connected to the bottom of the lower support shaft.

2. The adjustable elevating supporter for TV according to claim 1, wherein the spring body is a coil spring.

3. The adjustable elevating supporter for TV according to claim 1, wherein each of the two pressing portions has:
    a small-diameter portion having a diameter smaller than or equal to that of the fixing insertion hole and the insertion holes;
    a large-diameter portion having a diameter greater than that of the fixing insertion hole and the insertion holes; and
    an assembling hole, in which one of the two ends of the bias portion is inserted.

4. The adjustable elevating supporter for TV according to claim 1, wherein the biasing portion is a coil spring.

5. An adjustable elevating supporter for TV, comprising:
    a combination seat combined to and supporting a liquid crystal television;
    a supporter, comprising:
        an upper support shaft having an upper end combined to the combination seat and a lower end provided with at least one pair of fixing insertion holes; and
        a lower support shaft having an axial hole and at least two pairs of insertion holes, wherein the lower support shaft is a single segment comprising the at least two pairs of insertion holes, and one pair of the insertion holes is vertically separated from another pair of the insertion holes by a predetermined distance, wherein the lower end of the upper support shaft is inserted into the axial hole;

an elastic limit piece received in the upper support shaft, wherein the two ends of the elastic limit piece elastically abut against the fixing insertion hole and one pair of the insertion holes to define at least two different heights of the liquid crystal television;

an adjusting spring received in the axial hole of the lower support shaft to elastically support the lower end of the upper support shaft upward; and a base connected to a bottom of the lower support shaft.

6. The adjustable elevating supporter for TV according to claim 5, wherein the adjusting spring comprises:

an upper support sheet supporting the lower end of the upper support shaft upward;

a lower support sheet supporting the bottom of the axial hole; and a spring body having two ends which bias the upper support sheet and the lower support sheet, respectively.

7. The adjustable elevating supporter for TV according to claim 5, wherein the spring body is a coil spring.

8. The adjustable elevating supporter for TV according to claim 5, wherein the elastic limit piece comprises:

two pressing portions elastically abutting against and inserting in the fixing insertion hole and one pair of the insertion holes; and a biasing portion having two ends which bias the two pressing portions.

9. The adjustable elevating supporter for TV according to claim 8, wherein each of the two pressing portions has:

a small-diameter portion having the diameter smaller than or equal to that of the fixing insertion hole and the insertion holes;

a large-diameter portion having the diameter greater than that of the fixing insertion hole and the insertion holes; and an assembling hole, wherein one of the two ends of the bias portion is inserted into the assembling hole.

10. The adjustable elevating supporter for TV according to claim 8, wherein the biasing portion is a coil spring.

11. An adjustable elevating supporter for TV, comprising:

a combination seat combined to and supporting a liquid crystal television;

a supporter, comprising:

an upper support shaft having an upper end combined to the combination seat and a lower end provided with at least one pair of fixing insertion holes; and a lower support shaft having an axial hole and at least two pairs of insertion holes, wherein the lower support shaft is a single segment comprising the at least two pairs of insertion holes, and one pair of the insertion holes is vertically separated from another pair of the insertion holes by a predetermined distance, wherein the lower end of the upper support shaft is inserted into the axial hole;

an elastic limit piece received in the upper support shaft, wherein the two ends of the elastic limit piece elastically abut against the fixing insertion hole and one pair of the insertion holes to define at least two different heights of the liquid crystal television; and a base connected to the bottom of the lower support shaft.

12. The adjustable elevating supporter for TV according to claim 11, wherein the elastic limit piece comprises:

two pressing portions elastically abutting against and inserting in the fixing insertion hole and one pair of the insertion holes; and a biasing portion having two ends which bias the two pressing portions.

13. The adjustable elevating supporter for TV according to claim 12, wherein each of the two pressing portions has:

a small-diameter portion having the diameter smaller than or equal to that of the fixing insertion hole and the insertion holes;

a large-diameter portion having the diameter greater than that of the fixing insertion hole and the insertion holes; and an assembling hole, wherein one of the two ends of the bias portion is inserted into the assembling hole.

14. The adjustable elevating supporter for TV according to claim 12, wherein the biasing portion is a coil spring.

* * * * *